April 27, 1926. Re. 16,337

C. G. EDWARDS

BEARING LUBRICATOR

Original Filed Feb. 16, 1925

INVENTOR,
Clarence G. Edwards,
BY G. E. Maynard,
ATTORNEY.

Reissued Apr. 27, 1926. Re. 16,337

UNITED STATES PATENT OFFICE.

CLARENCE G. EDWARDS, OF LOS ANGELES, CALIFORNIA.

BEARING LUBRICATOR.

Original No. 1,551,649, dated September 1, 1925, Serial No. 9,485, filed February 16, 1925. Application for reissue filed September 16, 1925. Serial No. 56,775.

*To all whom it may concern:*

Be it known that I, CLARENCE G. EDWARDS, a citizen of Canada, and resident of Los Angeles, Los Angeles County, State of California, have invented new and useful Improvements in Bearing Lubricators, of which the following is a specification.

The invention relates to lubricating devices, and more particularly to a lubricator adapted for combination with the hub of a wheel running on a spindle.

An object of the invention is to provide means for effectively thrusting a lubricant endwise in a bearing organization so as to keep the load taking bearing surfaces thoroughly lubricated, especially while running at high speeds.

An object is to provide for maintaining a continual flow or circulation of lubricant endwise toward end bearings of a rotating element and yet to eliminate any loose parts and any spring actuated parts or other devices having any operation of their own aside from rotation of the lubricator with and by the rotating element whose bearing means is to be lubricated.

In other words an object is to provide a device adapted to be rigidly associated with the wheel hub and having means for automatically causing endwise flow of the lubricant as distinguished from a mere splash due to centrifugal action.

An object is to provide a device which affords a chamber in the hub wherein to carry a substantial supply of lubricant which will be subject not only to centrifugal or radial and tangential flowage but more especially will be diverted with appreciable acceleration and pressure endwise in the hub of the wheel and into its bearing means.

Numerous other objects and advantages will be made perceivable in the following specification of an embodiment of the invention exhibited in the related drawing; it being obvious and understood that this exposition is not intended to be limitary in character, but the usual reservation is here expressed of possible modification, variation and adaptation of the invention within the scope and spirit thereof.

Figure 1:
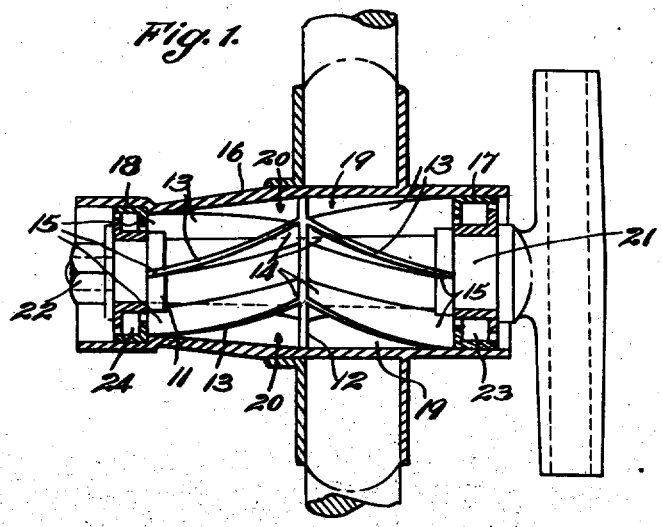
Figure 1 is a longitudinal section of a wheel hub showing the applied device in elevation.
Figure 2:
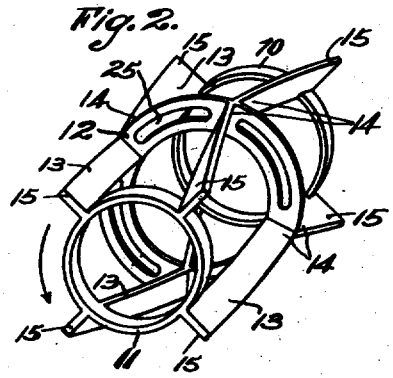
Figure 2 is a perspective of the lubricator.
Figure 3:
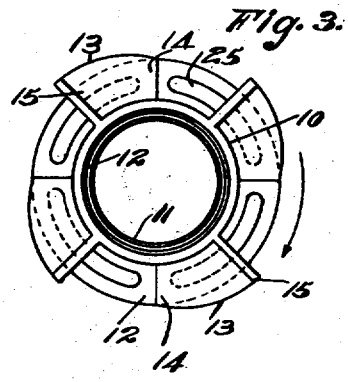
Figure 3 is an end view of the larger end thereof.

While the essential features of the invention may be incorporated in a variety of forms of devices for combination with a rotary element whose bearings are to be lubricated, it is here shown as including a system of blades 13 whose sides are radial to a common center and whose lengths are disposed materially helical as to the axis of rotation of the rotating wheel so that a plastic or liquid mass resting against the advance face of a blade will be thrust, as the blade sweeps in its orbit, endwise along the blade.

The outer longitudinal portions or edges of the blades 13 are disposed close to and extend along the concave or inner face of an associated shell, as the hub 16 of a wheel, which is here shown as provided with an inner bearing cup 17 and an outer bearing cup 18 taking bearings 23 and 24 on the spindle 21.

The blades 13 are suitably secured to turn with the rotating element of an organization, in this case the wheel hub 16 spaced around the spindle 21 by bearings 23—24. The blades are thus disposed longitudinally in a space within the hub and this space is divided by an intermediate, radially flat wall ring 12, into end chambers 19 and 20; the blades 13 being clearly shown in Fig. 1 as of two groups whose blades are reversely helically pitched and having their innermost ends 14 pointed forward as to the normal direction of rotation of the rotating element, or wheel, and which ends start from the sides of the dividing ring 12, which is apertured at 25, to allow passage of the lubricant.

Hence during rotation of the rotating element the blades 13 turn therewith and any lubricant thrown out against the shell and chamber surface by centrifugal force will, by the trailing obliquity of the front faces of the blades, be caused to slip, slide or flow toward the remote or tail ends of the blades and therefore be thrust into the bearing surfaces of rotation.

The blades turn as a unit and in the present form are spaced at their outer or tail ends to allow free flowage of the lubricant. In addition to the connection formed by the dividing ring 12, the remote ends 15 of the blades are connected by and to collar rings 10 and 11 which turn on the spindle 21.

A nut 22 retains the parts on the spindle.

The helical angle of the blades 13 may be varied as conditions may require and they may spring from opposite points on the dividing ring 12 or be offset on the sides.

What is claimed is:

1. A bearing lubricator comprising three rings arranged on a common axis and a plurality of regularly spaced blades fixed to said rings so as to hold them in spaced relation to each other, said blades in turn being held in spaced relation to each other by said rings.

2. A bearing lubricator comprising three rings and a plurality of regularly spaced blades fixed to said rings so as to extend edgewise radially therefrom, said blades being held in spaced relation to each other by said rings and said rings being held in spaced relation to each other on a common axis by said blades.

3. A bearing lubricator comprising three rings, an inner, an outer and an intermediate ring, arranged on a common axis in spaced relation to each other, and a plurality of regularly spaced radial blades fixed to said rings, said blades extending obliquely with reference to the common axis of said rings from said intermediate ring to said inner and outer rings.

4. A bearing lubricator for use in wheel hubs, comprising an inner ring, an outer ring and an intermediate ring arranged in spaced relation to each other on a common axis, and a plurality of regularly spaced radial blades fixed to said rings so as to extend obliquely from said intermediate ring to said inner and outer rings in the same circumferential direction.

5. A bearing lubricator for use in wheels having roller or ball bearings, comprising an inner band-ring, an outer band-ring and an intermediate disc-ring arranged in spaced relation to each other on a common axis, and a plurality of regularly spaced radial blades fixed to said rings, said blades being arranged in pairs having adjacent ends attached to said intermediate disc-ring in the same radial plane and extending obliquely at an angle to each other from said intermediate disc-ring to said inner and outer band-rings and having their opposite ends attached to said inner and outer band-rings in the same radial plane, so that when fixed in the hub of a wheel said blades cooperate therewith to form open ended chambers adapted for receiving a lubricant.

6. A lubricator adapted to be mounted between the hub shell of a wheel and the axle of the wheel and having oppositely pitching blade means for throwing and carrying a lubricant endwise toward each end of the hub to lubricate bearings thereof on the axle said blade means including a set of left hand pitched blades and a set of right hand pitched blades helically springing from a common connection consisting of a perforated, chamber partition ring.

7. Means for lubricating the end bearings of the hub of a wheel running on an axle, comprising a skeleton having blades disposed helically to the axis of the hub and rotative with the wheel, whereby to impel and carry the lubricant in the shell endwise toward the end bearings, and axially spaced end rings to which the remote ends of the blades are attached and from which all of the blades spring forward as to rotative action.

8. A wheel-hub bearing lubricator comprising a set of rigidly connected, helical blades set for rotation with the wheel, and operative to carry and direct lubricant along the hub chamber toward the bearings thereof, a carrier ring connecting and from which the trailing ends of the blades extend radially, and a partition ring connecting the forward ends of the blades and being spaced from the carrier ring.

9. In combination with a rotative device and stationary end bearing devices therefor and which form a lubricant containing chamber, a lubricator having blades extending longitudinally in the chamber and extending to the concave surface of the chamber so as to gather the centrifugally thrown oil and said blades pitching helically on the axis of the rotating part so as to carry and force the oil toward the end-bearing devices, all of the blades being rigidly connected with and pitching rearward, as to direction of rotation, from a transverse web intermediate the length of the chamber, and said web providing a hollow center for entry of an inserted part, and said blades extending in symmetrical sets from each side of the intermediate connecting web.

10. A lubricator comprising a partition ring and a series of generally helical blades extending from the opposite end faces of the ring.

11. A lubricator comprising a partition ring and a series of generally helical blades extending from the opposite end faces of the ring; the blades pitching forward, as to direction of rotation, toward the ring.

In testimony whereof I have set my hand.

CLARENCE G. EDWARDS.